(No Model.)
W. A. NETTLETON.
CORSET STIFFENER.
No. 265,534. Patented Oct. 3, 1882.
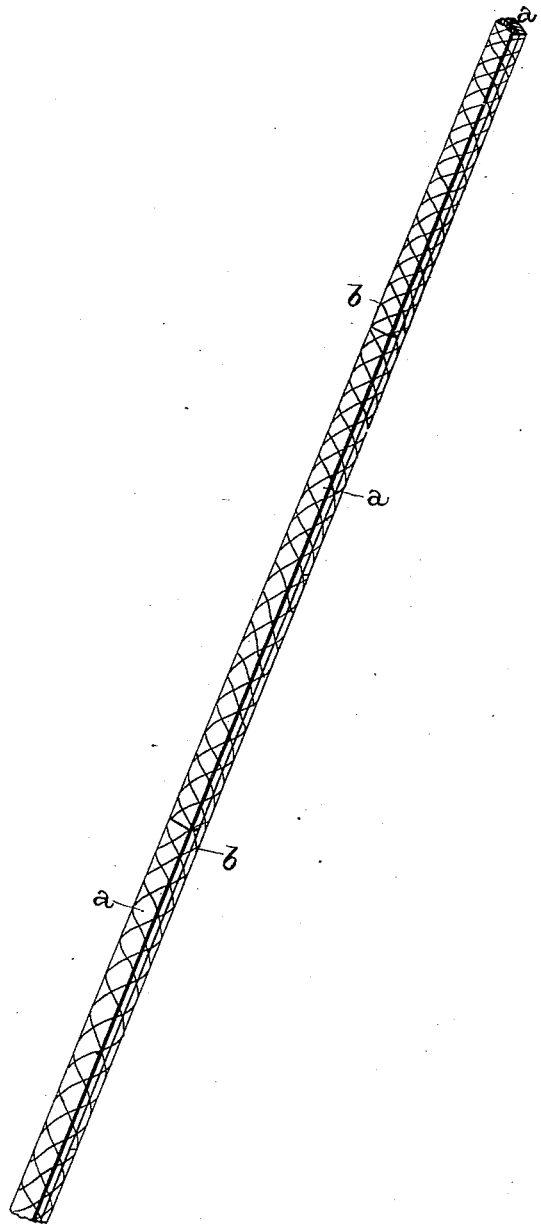
Witnesses.
L. J. Lehmann.
Robt. Johnson
Inventor.
Wm. A. Nettleton,
per
F. A. Lehmann,
Atty

UNITED STATES PATENT OFFICE.

WILLIAM A. NETTLETON, OF BRIDGEPORT, CONNECTICUT.

CORSET-STIFFENER.

SPECIFICATION forming part of Letters Patent No. 265,534, dated October 3, 1882.

Application filed June 20, 1882. (No model.)

*To all whom it may concern:*

Be it known that I, WM. A. NETTLETON, of Bridgeport, in the county of Fairfield and State of Connecticut, have invented certain new and useful Improvements in Stiffeners for Corsets; and I do hereby declare the following to be a full, clear, and exact description of the invention, such as will enable others skilled in the art to which it pertains to make and use it, reference being had to the accompanying drawing, which form part of this specification.

My invention relates to an improvement in stiffeners for corsets; and it consists in a stiffener which is made of a series of short pieces of horn or whalebone, which are united together by means of a suitable wrapping or covering, the pieces being united together in such a manner as to break joints, as will be more fully described hereinafter.

The object of my invention is to produce a stiffener which is substantially the same as those heretofore made from a single long piece of horn or whalebone, but which will be much cheaper, for the reason that it is made from a number of short pieces of horn which have been thrown away as waste or sold at a very low price.

The accompanying drawing represents my invention.

In making my stiffener I take a number of short pieces of horn or whalebone, *a*, and unite them together by wrapping them with a cord or thread, *b*, or a covering of any suitable material which will unite them together. These short pieces are united together so as to break joints, and are thus given a stiffness and strength equal at their weakest point to those stiffeners which have heretofore been made from a single piece of horn, and at other points of double strength.

Where a stiffener is to be made from horn the great trouble heretofore has been to get pieces which were long enough to make a stiffener, and as a horn would supply comparatively few of these long pieces the price of long horn stiffeners has been very high. By my invention I am enabled to utilize all of the short pieces which have been heretofore comparatively worthless as stiffeners, and make from them stiffeners which will answer every purpose, and which can be made of any desired length. Where the stiffeners are made quite long by uniting together a number of these short pieces the stiffeners can be cut up into suitable lengths.

Prior to my invention a corset-stiffener has been formed of short pieces cf horn secured together at their ends by threads, and interposed between cords or bundles of some fibrous material. By my construction a neater and more perfect stiffener is produced, since the ends of the horn do not overlap, as in the above-mentioned corset, but the short pieces of each continuous line thereof have their ends abutting against each other, and each line of pieces are parallel with each other.

Having thus described my invention, I claim—

As an improved article of manufacture, a corset-stiffener composed of two continuous parallel lines of short pieces of horn or whalebone, *a*, wrapped together by the thread *b*, said pieces being arranged so as to break joints in the manner specified.

In testimony whereof I affix my signature in presence of two witnesses.

WILLIAM ALFRED NETTLETON.

Witnesses:
V. R. C. GIDDINGS,
FRANK J. HUGHES.